(12) United States Patent
Hu et al.

(10) Patent No.: US 7,186,034 B2
(45) Date of Patent: Mar. 6, 2007

(54) OPTICAL FIBER CONNECTOR HAVING STOPPING MEANS

(75) Inventors: Lun Song Hu, Kunsan (CN); Yong Du, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/979,900

(22) Filed: Nov. 1, 2004

(65) Prior Publication Data

US 2005/0100284 A1 May 12, 2005

(30) Foreign Application Priority Data

Nov. 6, 2003 (CN) ...................... 2003 2 01205063

(51) Int. Cl.
*G02B 6/36* (2006.01)
(52) U.S. Cl. ............................ 385/53; 385/78; 385/88; 385/92
(58) Field of Classification Search ............. 385/53–94
See application file for complete search history.

(56) References Cited

U.S. PATENT DOCUMENTS

| | | | |
|---|---|---|---|
| 5,363,460 A * | 11/1994 | Marazzi et al. | 385/70 |
| 6,186,670 B1 * | 2/2001 | Austin et al. | 385/55 |
| 6,206,577 B1 * | 3/2001 | Hall et al. | 385/53 |
| 6,481,902 B2 | 11/2002 | Takaoka et al. | |
| 6,499,889 B1 * | 12/2002 | Shirakawa et al. | 385/88 |
| 6,527,459 B2 | 3/2003 | Nishita et al. | |
| 6,554,495 B1 | 4/2003 | Zhu | |
| 2002/0191921 A1 * | 12/2002 | Satoh | 385/92 |
| 2003/0147597 A1 * | 8/2003 | Duran | 385/76 |
| 2004/0190851 A1 * | 9/2004 | Garner et al. | 385/137 |

\* cited by examiner

*Primary Examiner*—Frank G. Font
*Assistant Examiner*—Eric Wong
(74) *Attorney, Agent, or Firm*—Wei Te Chung

(57) ABSTRACT

An optical fiber connector (1) includes a housing (10), an insulated body (20), an optical element (30) received in the housing, and a spacer (40) for securing the optical element in the housing. The housing defines a front and a rear receiving spaces (11, 12). The front receiving space is for receiving the insulated body and an optical plug (60), and the rear receiving space is for receiving the optical element. A partition wall (13) is formed between the front and the rear receiving spaces and defines an aperture (14) thereon. The aperture forms a tapered face (15) at a rear portion thereof for preventing the optical fiber plug from inserting into the optical fiber connector.

14 Claims, 7 Drawing Sheets

OPTICAL FIBER CONNECTOR HAVING STOPPING MEANS

BACKGROUND OF THE INVENTION

1. Field of the Invention

The present invention generally relates to an optical fiber connector, and more particularly to an optical fiber connector used in consuming products or short distance telecommunication environment.

2. Description of Prior Art

With the development of telecommunication technology, a need of optical fiber connectors is increased. The optical fiber connector usually uses a metal or a ceramic pin for fixation of the fibers and the pin is assembled in a metal shield for mating of the fibers. However, Such kind of optical fiber connector has a relatively complex structure and requires accurate mechanical orientation. In addition, the optical fiber connector is only suitable to be assembled by hand, and thus, the manufacturing cost thereof is relatively too high.

U.S. Pat. No. 6,554,495 discloses an optical fiber connector mainly used for consuming electronic products such as video and audio electronic products or optical fibers transmission in short distance. The optical fiber connector has simple structure with plastic plug and socket. The optical fiber connector can be produced by insert molding technology and needs no plated layer, therefore, is very suitable for automatic product.

An optical fiber connector 70 mating with an optical fiber plug 60 is shown in FIG. 1. In order to show the assemble relations between elements of the optical fiber connector 70 clearly, the detail structures of some elements, such as an optical element 30, are simplified to show sketch drawings in FIG. 1, The optical fiber connector 70 comprises an insulated body 71, a housing 72, an elastic door 73, the optical element 30 assembled to a rear portion of the housing 72, and a spacer 40 retaining the optical element 30 in the housing 72. However, if the length of the optical fiber plug 60 is longer than that of a standard element, a head portion 63 of the optical fiber plug 60 may interfere with the optical element 30 and further push the spacer 40 outwardly from the housing 72. The optical element 30 may separate from the housing 72 together with the spacer 40, thus, the reliable engagement between the optical element 30 and the housing 72 can not be assured.

Hence, an improved optical fiber connector is required to overcome the disadvantages of the prior arts.

SUMMARY OF THE INVENTION

Accordingly, it is an object of the present invention to provide an optical fiber connector having stopping means to prevent a complementary optical fiber plug from inserting into the optical fiber connector too deeply.

In order to achieve the object set forth, provided is an optical fiber connector in accordance with the present invention comprising a housing having a front receiving space and a rear receiving space, an insulated body inserted into the front receiving space, an optical element received in the rear receiving space, and a spacer securing the optical element in the housing. The insulated body defines a chamber for receiving an optical fiber plug. A partition wall is formed between the front and the rear receiving spaces with an aperture connecting the front receiving space to the rear receiving space. The aperture defines a tapered face in a rear thereof.

In the such constructed optical fiber connector, the dimension of the aperture is similar to that of the complementary optical fiber plug, but the dimension of the tapered face is smaller than that of a head portion of the optical fiber plug. Thus, when the optical fiber plug mates with the optical fiber connector according to the present invention, the optical fiber plug is prevented by the tapered face of the optical fiber connector from inserting into the rear receiving space of the optical fiber connector to cause the optical element destroyed.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
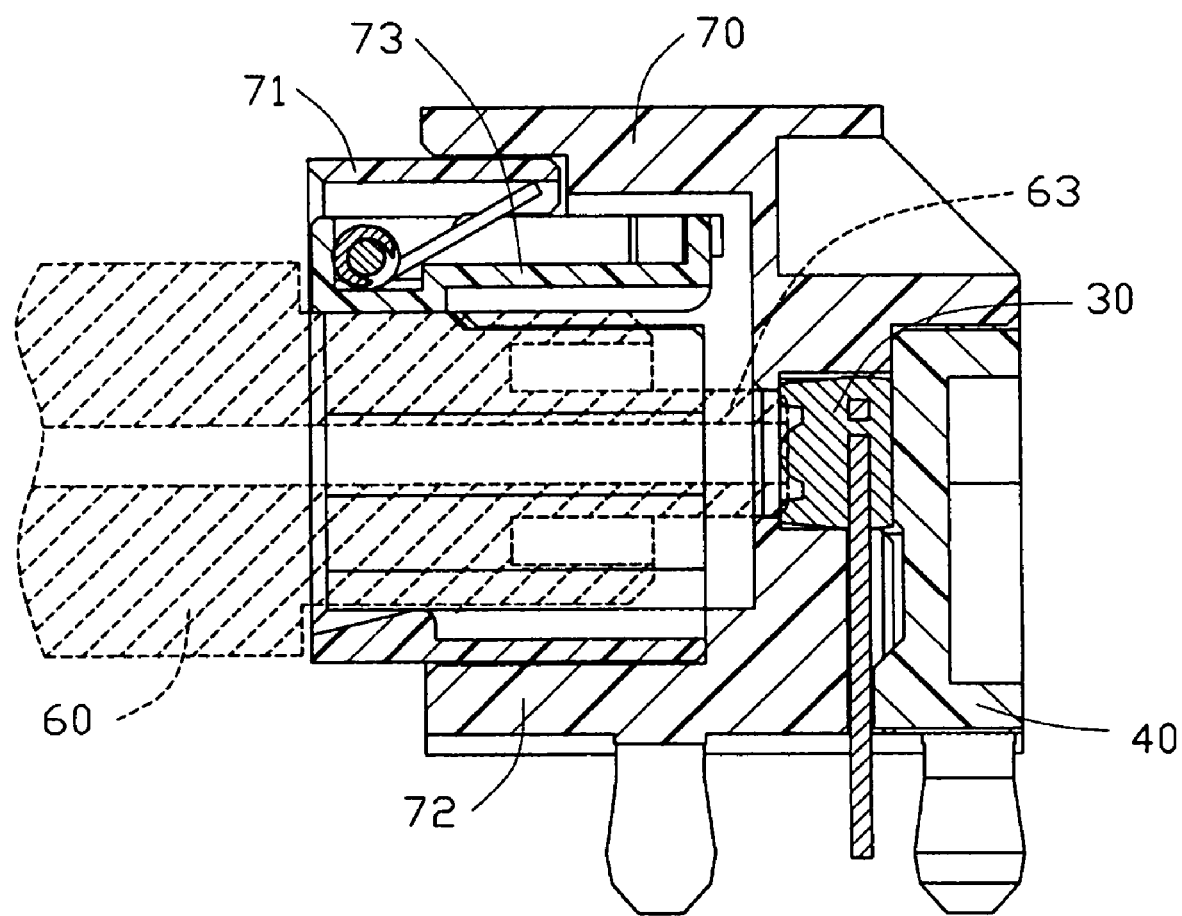
FIG. 1 is a cross-sectional view of a conventional optical fiber connector mating with a complementary optical plug.
Figure 2:
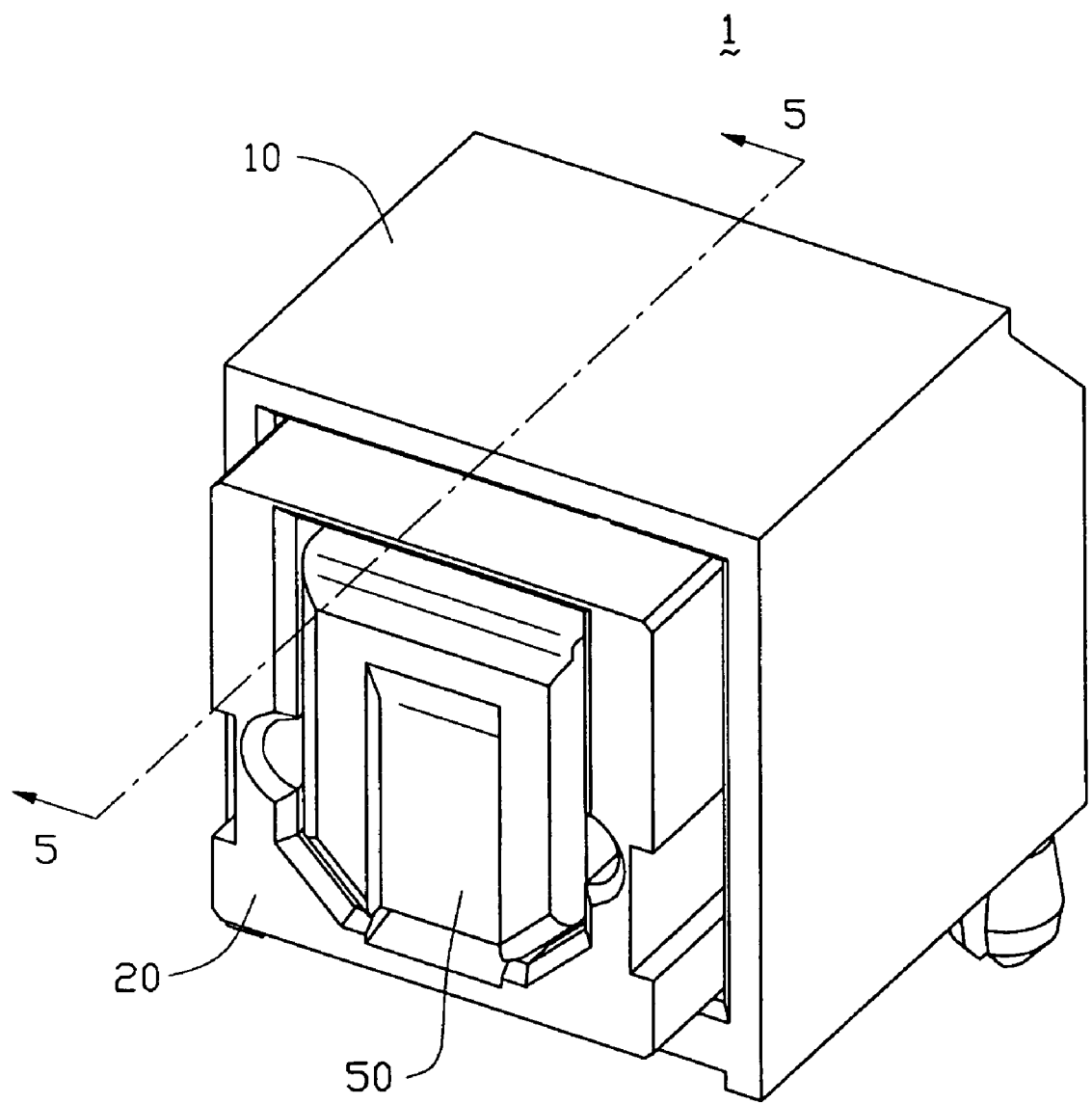
FIG. 2 is a perspective view of an optical fiber connector in accordance with the present invention.
Figure 3:
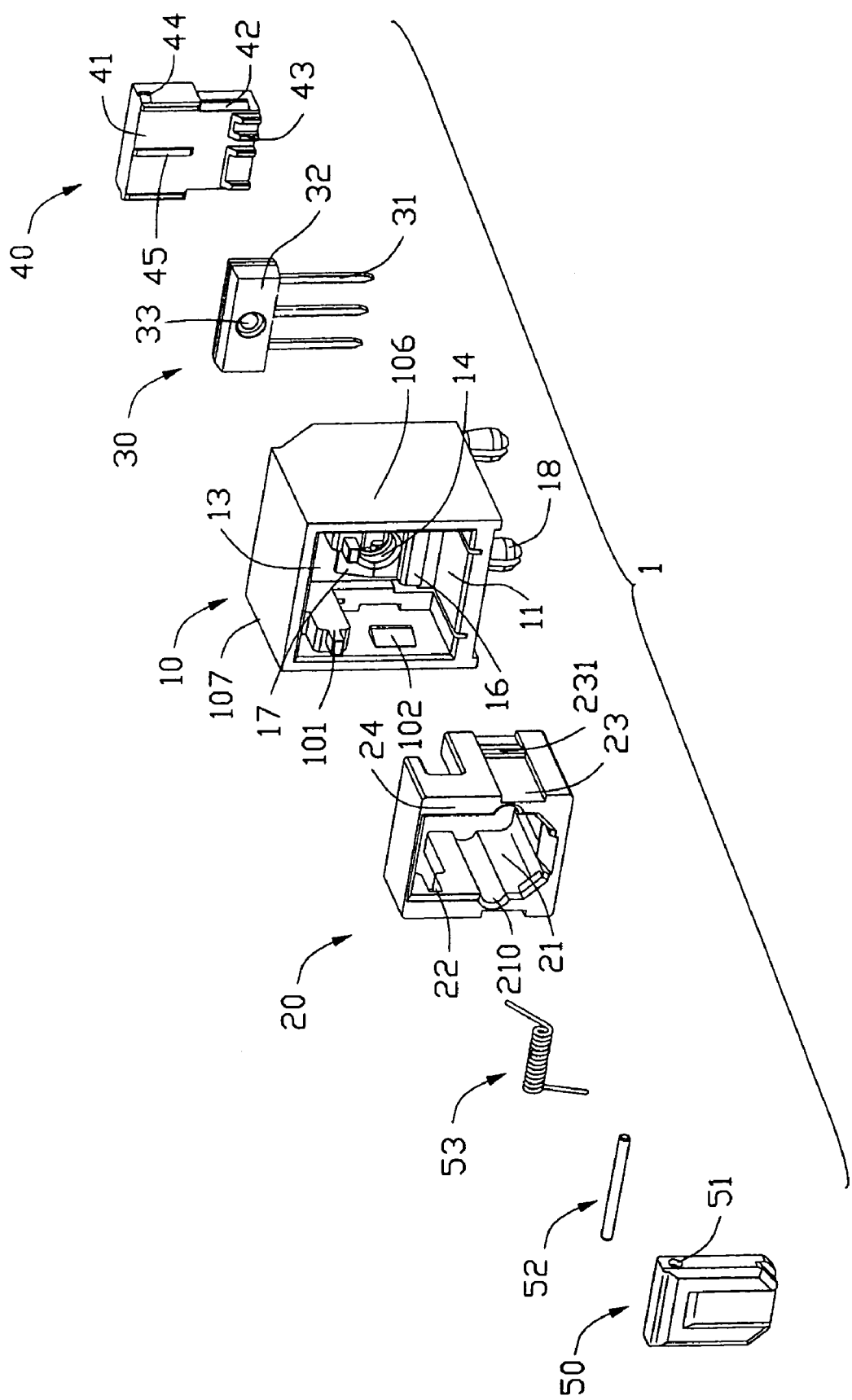
FIG. 3 is an exploded, perspective view of FIG. 2.
Figure 4:
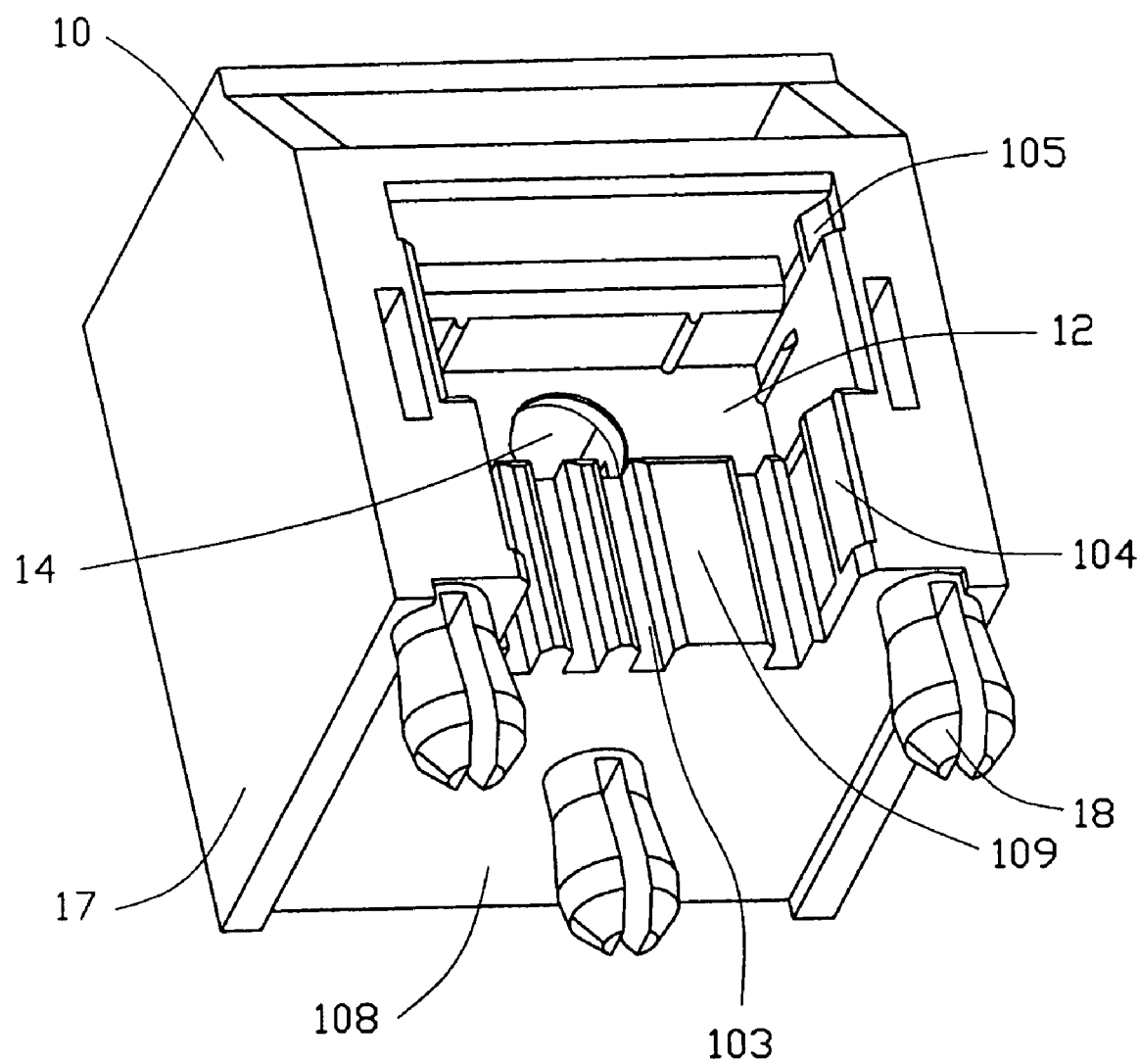
FIG. 4 is a perspective view of a housing of the optical fiber connector.

Referring to FIGS. 2 and 3, an optical fiber connector 1 in accordance with the present invention comprises a housing 10, an insulated body 20, an optical element 30, a spacer 40 and an elastic door 50.

In order to show the assemble relations between the elements of the optical fiber connector 1 clearly, the detail structure of the elements, such as the optical element 30, are simplified to show sketch drawing in FIGS. 2 to 7. Turning to FIGS. 2 and 3, the insulated body 20 has a top wall (not labeled) and a pair of opposite sidewalls 24. The top wall and the sidewalls 24 define a chamber 21. The sidewalls 24 are partially cut away to form a pair of openings 22 adjacent to the top wall. A pair of receiving grooves 210 and a pair of cutoffs 23 are respectively arranged on the insides and the outsides of the sidewalls 24. Pair of semicircular ribs 231 are respectively formed on bottom surfaces of the cutoffs 23.

The optical element 30 has a main body 32, a plug engaging portion 33 and a plurality of terminals 31 through which the optical element 30 connects with a printed circuit board (not shown). The optical element 30 is securely assembled in the housing 10 with the spacer 40 mounted to the housing 10.

The spacer 40 comprises a main board 41 with a plurality of embossments 43 formed on a lower portion thereof and an engaging portion 45 on an upper portion thereof, and a plurality of first and second locking blocks 42, 44 on opposite sides of the main board 41.

The elastic door 50 has a hole 51 through a top portion thereof. A spindle 52 is received in the hole 51 with a spring 53 assembled thereon.

Figure 5:
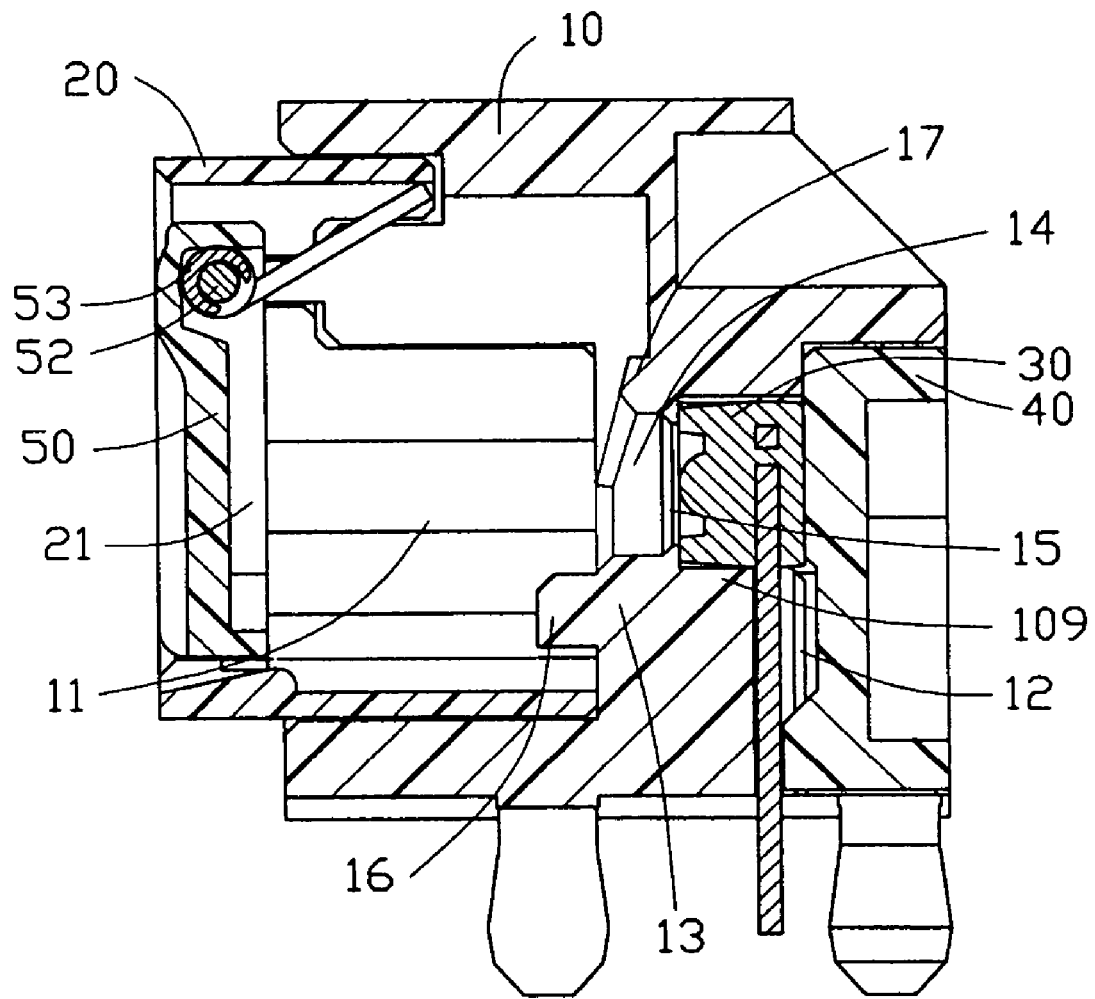
FIG. 5 is a cross-sectional view of the optical fiber connector taken along line 5—5 of FIG. 2.

Referring to FIGS. 3 and 5, the housing 10 comprises a pair of lateral walls 106 connected by a top wall 107 and a bottom wall 108. The walls 106, 107, and 108 together form a front receiving space 11 and a rear receiving space 12. The front receiving space 11 is for receiving the insulated body 20 and an optical plug 60 and the rear receiving space 12 is for receiving the optical element 30.

A partition wall 13 is formed between the front receiving space 11 and the rear receiving space 12 with a projection 17 thereof protruding into the front receiving space 11. A stop block 16 protrudes forwardly from the projection 17 into the front receiving space 11. An aperture 14 is defined through the partition wall 13 with a tapered face 15 formed in a rear thereof toward the rear receiving space 12. The dimension of the aperture 14 is similar to that of a head portion 63 of the optical fiber plug 60, but the dimension of the tapered face 15 is smaller than that of the head portion 63. The distance between the front face of the stop block 16 and the tapered face 15 is corresponding with the length of the optical plug 60.

Each of the lateral walls 106 has a protrusion 101 protruding from two opposite sides of the partition wall 13 to the front receiving space 11 for engaging with the opening 22 of the insulated body 20, and a key 102 below the protrusion 101 for latching with the corresponding ribs 231 of the insulated body 20. A flat portion 109 is formed in the rear receiving space 12 for sustaining the optical element 30. The flat portion 109 has a plurality of slots 103 for receiving the terminals 31 of the optical element 30 and the embossments 43 of the spacer 40. A plurality of first and second latches 105, 104 are respectively defined on the upper and the lower portions of the rear receiving space 12 for latching with the first and the second locking blocks 44, 42 of the spacer 40. Therefore, the spacer 40 and the optical element 30 are assembled to the housing 10. A plurality of posts 18 protrude downwardly from the bottom wall 108 of the housing 10 for retaining the optical fiber connector 1 on the printed circuit board.

Figure 6:
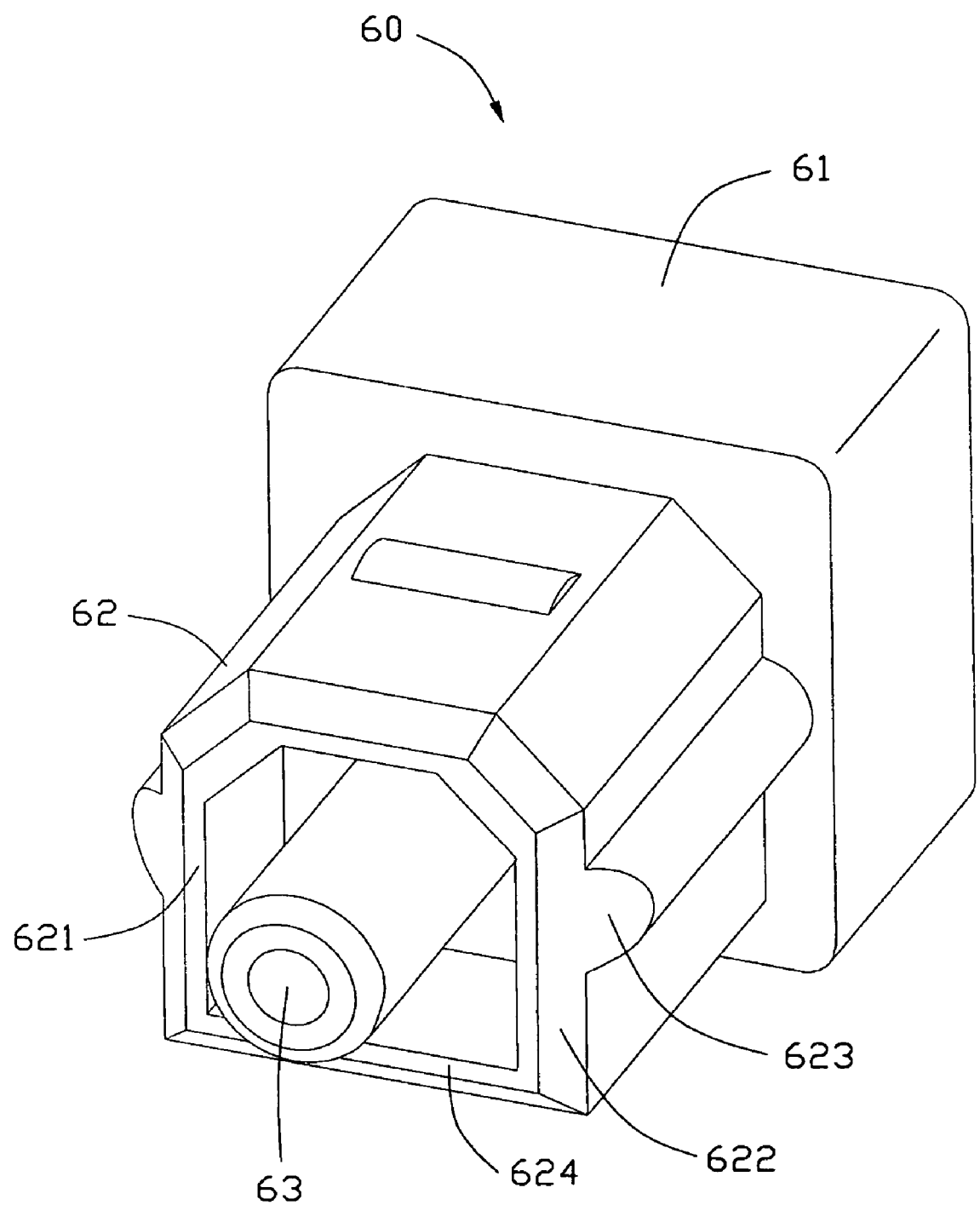
FIG. 6 is a perspective view of the complementary optical fiber plug.

Referring to FIG. 6, the optical fiber plug 60 comprises a main body 61, the head portion 63 protruding outwardly from a front portion of the main body 61, and a ferrule 62 surrounding the head portion 63. A pair of guiding portions 623 are integrally formed on opposite sides 622 of the ferrule 62.

Figure 7:
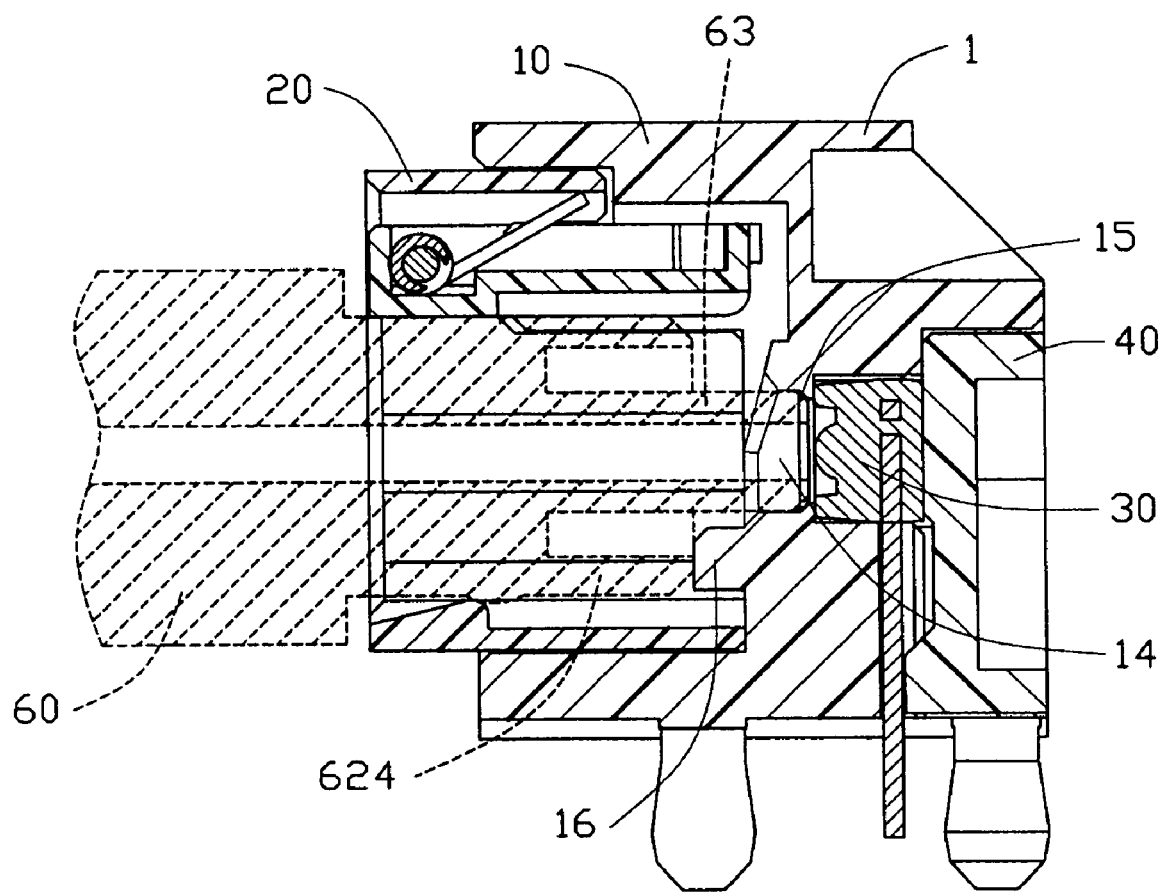
FIG. 7 is a cross-sectional view illustrating the optical fiber connector and the mated complementary optical fiber plug.

Referring to FIG. 7, as the optical fiber plug 60 is inserted into the optical fiber connector 1, the ferrule 62 is received in the front receiving space 11, and the head portion 63 protrudes into the aperture 14. Then the free end of the head portion 63 is prevented from entering into the rear receiving space 12 by the tapered face 15 of the housing 10. Additionally, the stop block 16 abuts against the ferrule 62, this further prevents the optical fiber plug 60 from inserting into the rear receiving space 12. So, when the length of the optical fiber plug 60 is longer than that of a standard element, the optical fiber connector 1 in accordance with the present invention could stop the optical fiber plug 60 to insert into the housing 10 too deeply and prevent the head portion 63 of the optical fiber plug 60 from interfering with the optical element 30 and pushing the spacer 40 backwardly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector for mating with a complementary optical fiber plug, comprising:
    a housing having a front receiving space for receiving the optical fiber plug and a rear receiving space in a mating direction, the optical fiber plug having a head portion formed at a front end thereof;
    an optical element received in the rear receiving space of the housing;
    wherein the housing comprises a partition wall extending between the front and the rear receiving spaces, and the partition wall defines an aperture with a stopper device formed at a rear end thereof; and
    wherein when the optical fiber plug is received in the front receiving space in the mating direction, the head portion thereof at least partially enters the aperture defined in the partition wall and is obstructed against by the stopper device in the mating direction to prevent excessive and improper insertion of the head portion from interfering with the optical element.

2. The optical fiber connector as described in claim 1, wherein the stopper device is in a form of tapered aperture communicating with the rear receiving space of the housing, radial dimension of the tapered aperture being smaller than that of the head portion of the optical fiber plug.

3. The optical fiber connector as described in claim 1, wherein the housing has a stop block protruding from the partition wall and extending into the front receiving space, and the stop block is positioned below the aperture.

4. The optical fiber connector as described in claim 1, further comprising an elastic door assembled on the insulated body and being rotatable within the insulated body.

5. The optical fiber connector as described in claim 4, wherein said elastic door has a hole through a top portion thereof, a spindle is received in the hole with a spring assembled thereon.

6. An optical fiber connector comprising:
    a housing defining a front receiving space for receiving an optical fiber plug; and a rear receiving space along a front-to-back direction, and a partition wall formed between the front and rear receiving spaces and defining an aperture extending therethrough to communicate the front receiving space and the rear receiving space;
    a door pivotally mounted around a front end of said front receiving space;
    an optical element received in the rear receiving space of the housing and intimately confronting the aperture; and
    a stopper device formed in the aperture so as to result in diameter reduction of the aperture proximate the rear receiving space for preventing excessive and improper insertion of the optical plug; wherein
    said stopper device is dimensioned, configured and positioned for abutment against a head portion of a ferrule of said optical fiber plug in the front-to-back direction.

7. The optical fiber connector as described in claim 6, wherein a dimension of said stop device is smaller than that of the header portion so as to obstruct excessive and improper insertion of the optical fiber plug.

8. An optical fiber connector assembly comprising:
    a housing defining a front and a rear receiving spaces;
    an optical fiber plug defining a mating section received in the front receiving space;
    an optical element received in the rear receiving space of the housing;

wherein the housing comprises at least a first stopper device and a second stopper device both located in front of the rear receiving face, and the first stopper device is arranged in front of the second one;

wherein the housing further comprises a partition wall between the front and the rear receiving spaces, and the first stop device is formed in a form of projection protruding from the partition wall and into the front receiving space, the second stopper device is defined in the partition wall;

wherein the mating section of the optical fiber plug includes a ferrule and a head portion which extends forwardly beyond the ferrule, and wherein when optical fiber plug inserted into the front receiving space, either the first stopper device obstructs against said ferrule or the second stopper device engages against said head portion of the optical fiber plug.

9. The optical fiber connector assembly as described in claim 8, wherein said second stopper device is in a form of taper hole, and radial dimension thereof is smaller than that of said head portion of the optical fiber plug so as to obstruct excessive movement of said head portion.

10. The optical fiber connector assembly as described in claim 8, further comprising a spacer detachably mounted to the housing and the optical element being secured between the spacer and the housing.

11. The optical fiber connector as described in claim 1, further comprising an insulated body substantially received in the front receiving space of the housing, the insulated body defining a chamber overlapping the front receiving space and receiving the optical fiber plug therein.

12. The optical fiber connector as described in claim 11, wherein the insulated body defines at least an opening in a sidewall thereof, the housing having at least a protrusion extending from the partition wall and into the front receiving space to engage with the opening of the insulated body.

13. The optical fiber connector as described in claim 11, wherein the insulated body defines a plurality of ribs on sidewalls thereof, the housing having a plurality of latching key projecting from sidewalk thereof and into the front receiving space to latch with the ribs of the insulated body.

14. The optical fiber connector as described in claim 1, further comprising a spacer detachably assembled to the housing from rear thereof and being disposed behind the optical element to secure the optical element in the rear receiving space.

* * * * *